US006615885B1

(12) United States Patent
Ohm

(10) Patent No.: US 6,615,885 B1
(45) Date of Patent: Sep. 9, 2003

(54) RESILIENT WHEEL STRUCTURE

(75) Inventor: Timothy R. Ohm, Grover Beach, CA (US)

(73) Assignee: iRobot Corporation, Burlington, MA (US)

(*) Notice: Subject to any disclaimer, the term of this patent is extended or adjusted under 35 U.S.C. 154(b) by 0 days.

(21) Appl. No.: 10/055,314

(22) Filed: Oct. 29, 2001

Related U.S. Application Data
(60) Provisional application No. 60/244,180, filed on Oct. 31, 2000.

(51) Int. Cl.$^7$ ................................................. B60B 9/26
(52) U.S. Cl. ............................ 152/11; 152/17; 152/69; 152/86
(58) Field of Search ...................... 152/1, 5, 6, 7, 152/11, 12, 17, 31, 69, 75, 80, 85, 86

(56) References Cited

U.S. PATENT DOCUMENTS

| | | | | |
|---|---|---|---|---|
| 967,740 | A | * | 8/1910 | Dorffel |
| 1,080,649 | A | * | 12/1913 | Morgan |
| 1,348,590 | A | * | 8/1920 | Shea |
| 1,509,982 | A | * | 9/1924 | Schoeneck et al. |
| 1,522,315 | A | * | 1/1925 | Nash |
| 1,625,518 | A | * | 4/1927 | Beisel |
| 1,639,827 | A | * | 8/1927 | Wayne |
| 1,858,723 | A | * | 5/1932 | Weaver |
| 4,447,093 | A | * | 5/1984 | Cunard et al. |
| 4,832,098 | A | * | 5/1989 | Palinkas et al. |

* cited by examiner

Primary Examiner—Russell D. Stormer
(74) Attorney, Agent, or Firm—Fish & Richardson P.C.; Glen D. Weinstein

(57) ABSTRACT

A resilient wheel structure having a rim and a hub interconnected by spokes, wherein the rim is sufficiently stiff to distribute a load to all of the spokes, and wherein the wheel is able to absorb loads in both the radial and axial directions. The rim comprises an inner and outer rim portion supported by ribs, that are located co-radially with curved spokes that allow tension and compression. The wheel structure being optimally used on a mobile robot.

48 Claims, 4 Drawing Sheets

RESILIENT WHEEL STRUCTURE

CROSS REFERENCE TO RELATED APPLICATIONS

This application claims the benefit of U.S. Provisional Application Serial No. 60/244,180, filed Oct. 31, 2000.

STATEMENT AS TO FEDERALLY SPONSORED RESERACH

This invention was made in part with Government support under contract MDA972-00-C-0011 awarded by the Defense Advanced Research Projects Agency. The Government may have certain rights in the invention.

BACKGROUND OF THE INVENTION

The invention relates to a resilient wheel structure, able to withstand significant loading. In certain embodiments, the wheels of the present invention can be mounted to a vehicle to allow the vehicle to withstand significant impacts. Such a vehicle is disclosed in U.S. Pat. No. 6,263,989, which disclosure is incorporated herein by reference.

A number of resilient wheel designs exist in the prior art. For example, Great Britain Pat. No 1 292 928, published Oct. 18, 1972, discloses a spring-type wheel which allows resilient radial movement of the rim relative to the hub. Also, U.S. Pat. No. 4,553,577, issued Nov. 19, 1985, discloses a wheel structure that allows each spoke to come into contact with an adjacent spoke, which limits the distortion of the spokes under load. Each of these wheels is designed to absorb radial energy only and do not provide complete load distribution.

The wheel structures that have been used in the prior art exhibit various shortcomings, many of which are addressed by the present invention.

The present invention provides a modified and improved form of such a wheel particularly suited for use with delicate electronics mounted onto a mobile platform.

SUMMARY OF THE INVENTION

In accordance with the present invention a resilient wheel structure comprises a continuous, annular rim, a hub and a plurality of spokes connecting the hub to the rim, wherein the particular curvature of the spokes provide absorption of energy caused by sudden loads in any direction, and wherein the rim is sufficiently stiff to transmit the load to all of the spokes.

Accordingly, the present invention has several objects and advantages.

It is an object of the invention to provide a wheel with a rim sufficiently stiff to effectively distribute load to all of the spokes of the wheel.

It is an object of the invention to have a wheel such that loading is evenly distributed. It is a further object of the invention to provide a wheel able to absorb loads from impacts or shock in any direction, not merely radial loads.

It is an additional object of the invention to provide a resilient wheel that can be conventionally machined.

It is an object of the invention to provide a wheel with maximum energy absorption capacity while minimizing the weight.

It is an object of the invention to provide a wheel suitable for use in a mobile robot that can be deployed by being thrown into a building or dropped from a helicopter, wherein the wheels and/or wheels with tracks protect the body of the robot during high impact deployment.

Other features and advantages of the invention will be apparent from the following detailed description, including the associated drawings, and from the claims.

DETAILED DESCRIPTION

Figure 1:
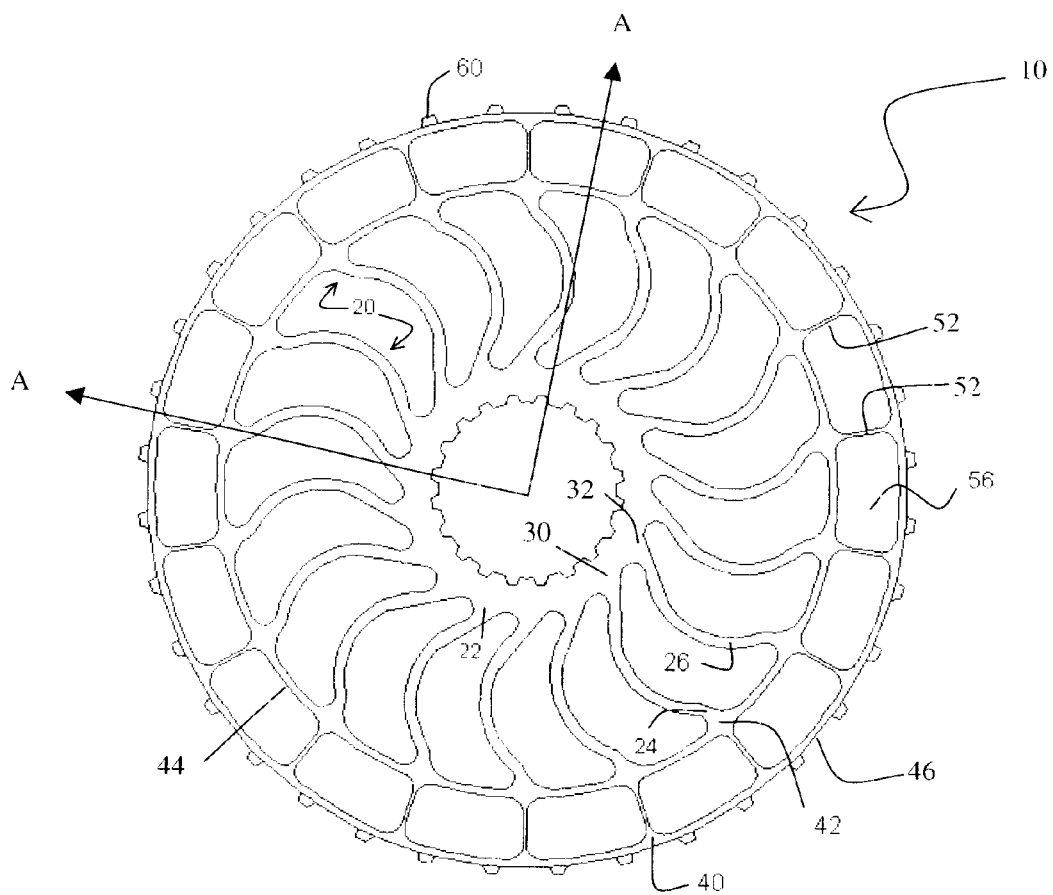
FIG. 1 shows an embodiment of the wheel according to the invention.

Referring to FIG. 1, the wheel 10 possess a continuous rim 40, a hub 30 and spokes 20 all integrally molded in, or machined from, a suitable high resiliency material such as impact-resistant polymers. In other embodiments, alternative materials can be used including resilient composites and certain high strength metals such as spring steel. It should be noted that in embodiments using metals, the aspect ratios of the spokes should be altered appropriately (e.g. made significantly thinner).

Lightweight materials like polymers are preferred in part because the mass of the wheel contributes to the energy that must be absorbed during an impact event. In addition to strength/weight considerations, cost and ease of machinability may also be considered in choosing a suitable material.

In certain embodiments, the rim 40 can be constructed out of one material and the spokes 20 constructed out of a different material. For example, a metal/polymer composite can be used with the stiffer metal as the rim 40 and composite for the spokes 20. However, such a design would require a means for bonding the two materials, for example a polyurethane cast onto the metal rim. The preferred embodiment is constructed from a homogeneous material.

The rim 40 is designed for maximum rigidity, which allows the force from any impact or load to be distributed to the maximum number of spokes 20. In the preferred embodiment, the distributive effects of the rim 40 are accomplished by incorporating an inner rim 44, and outer rim 46, and one or more ribs 52 connecting the inner rim 44 and the outer rim 46. The ribs 52 and the relationship between the inner rim 44 and the outer rim 46 is discussed in more detail below and with reference to FIG. 2.

Figure 5A:
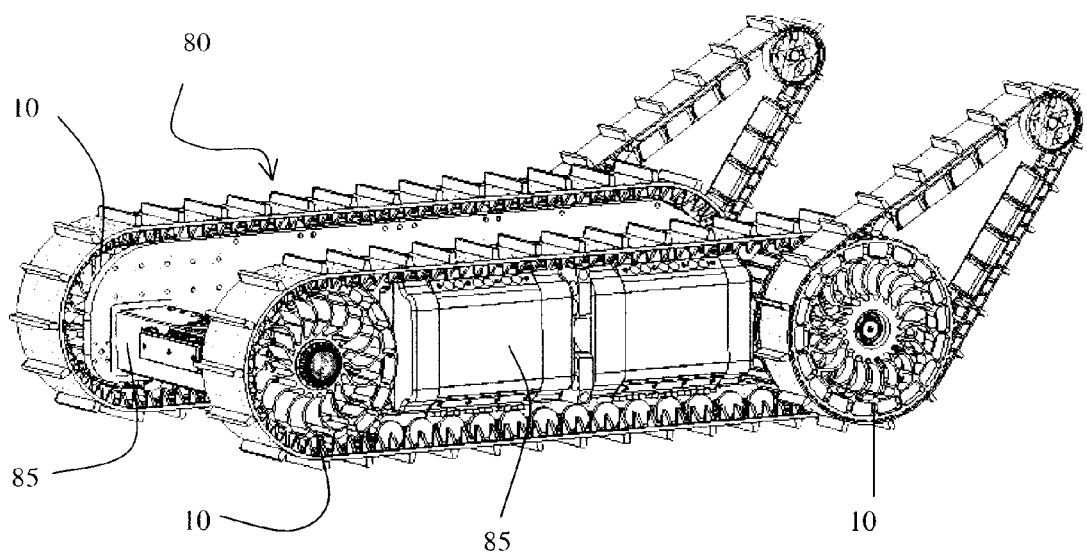
FIGS. 5A & 5B show the preferred embodiment of the present invention mounted on a mobile robot.
Figure 5B:
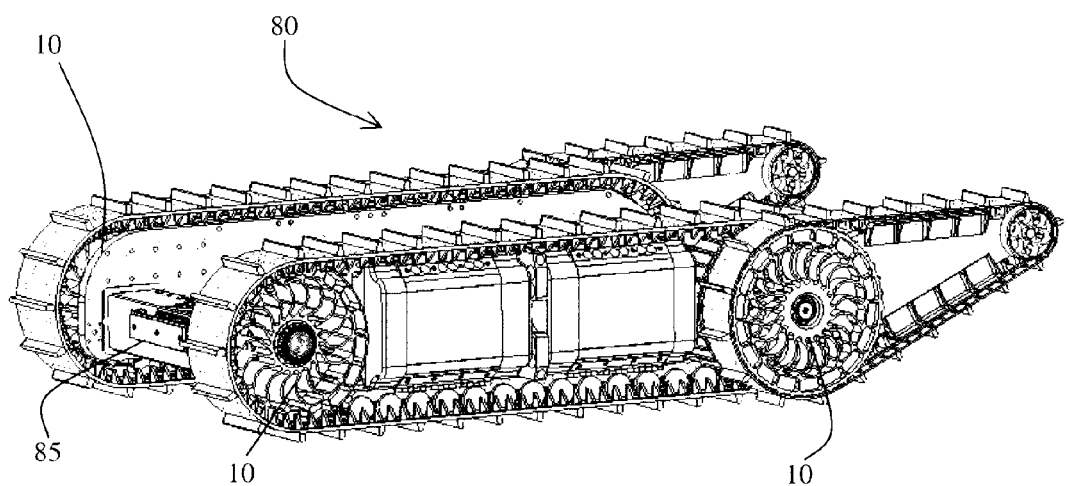

The dimensions of the preferred embodiment were chosen based on particular criteria dictated by its use in the mobile robot shown in FIG. 5. One of skill in the art, knowing the design criteria for the amount of energy to absorb and the specific material or materials chosen, will be able to determine the volume of material that must actively absorb the energy. Spokes that are not used actively to absorb the energy, merely add weight to the vehicle and further increase the demands on the active spokes.

In the preferred embodiment of the wheel 10 shown in FIG. 1, there are eighteen identical spokes 20 equispaced around the wheel 10. Each spoke 20 extends from a rim origin point 42 at the inner rim 44 to a hub origin point 32.

In the preferred embodiment, each spoke 20 can be described to have three portions, each curving about a unique point. The first spoke portion 22 of the spoke 20 is connected to the hub 30 at the hub origin point 32. In the preferred embodiment, the first spoke portion 22 curves in a generally clockwise direction extending from the hub 30 towards the rim 40. A second spoke portion 24 is connected to the rim 40 at the rim origin point 42, and curves in a counterclockwise direction from the rim 40 toward the hub 30. The third spoke portion 26 connects the first spoke portion 22 to the second spoke portion 24, and curves in a counterclockwise direction from the hub 30 toward the rim 40.

In the embodiment shown in FIG. 1, the first and second spoke portions 22 & 24, respectively, are considerably shorter than the third spoke portion 26. In the embodiment shown, the length of the third spoke portion 26 can be greater than the hub-to-rim radial distance of the wheel 10.

During a loading or impact event, in order to minimize localized stress on the wheel 10 in general and at the hub original point 32 in particular, the spoke portions 22, 24 and 26 are each arcs of a circle and their meeting locations are tangent to one another.

The dimensions of the preferred embodiment were chosen specifically for use on the mobile robot shown in FIG. 5, and one of skill in the art will be able to adjust the dimensions for use on any number of vehicles with varying load requirements. The preferred embodiment was designed to have an outer rim 46 diameter of approximately 15.5 cm and an inner hub diameter of 3.8 cm. Moreover, the wheels, in the configuration shown in FIG. 5, are required to absorb approximately 55 kg-meters of energy. In the preferred embodiment, the hub 30 thickness of approximately 6.4 mm provides adequate load transfer, leaving approximately 5.3 cm radially for both the spokes 20 and the rim 40. In the preferred embodiment, the rim 40 is approximately 16 mm thick, and the spokes 20 are approximately 3 mm thick and approximately 37 mm in length. While a thicker rim 40 can be used for effective transmitting of a load to the spokes 20, one of skill in the art will recognize that the spokes must have adequate length to accommodate the sufficient curvature to allow the spokes to expand and contract enough to accommodate the deformation transferred by the stiffer rim.

In the preferred embodiment, the radii of spoke portions 22 & 24 are sufficiently large to reduce stress concentrations endemic in sharp corner interactions between the spoke portions and the rim 40 or hub 30. One of skill in the art will recognize that, for a given diameter wheel 10, as the radii of the first and second spoke portions 22 & 24 is increased, the length of the third spoke portion 26 must be decreased (for a given curvature), resulting in less spoke length for absorbing energy. In the preferred embodiment, the first and second spoke portions 22 & 24 should each be between 5–20%, preferably 15%, of the total length of spoke 20, with the third spoke portion 26 constituting the remainder of the spoke 20.

One of skill in the art will recognize that the general shape of the third spoke portion 26 is well known in the art as a structure than can deform in three axes and have no inflection points, thus providing zero stress transitions from tension to compression along the surface of the spoke. In the preferred embodiment, three axes deformations are necessary not only to absorb energy from radial shocks, but also from axial loads and side impacts.

In the preferred embodiment, each spoke 20 is identical; that is, the length and curvature of each first spoke portion 22 is identical, the length and curvature of each second spoke portion 24 is identical and the length and curvature of each third spoke portion 26 is identical. In other embodiments, each spoke 20 need not be identical.

The spokes of the preferred embodiment are of uniform thickness and have a substantially rectangular cross section. In other embodiments, the spokes 20 can be thicker along their median line than they are at the face of the wheel. Such a design may be necessary in a molded wheel in order to accommodate draft angles in the mold.

Although the benefits inherent in the present invention are not limited to machined wheels, in the preferred embodiment, the number, spacing and orientation of the spokes 20 have been chosen to allow for ease of machinability. For example, in the preferred embodiment shown in FIG. 1, the relatively large radii of first and spoke portions 22 and 24 allow the design to be easily machined with conventional methods such as conventional milling machines; this is advantageous in that some high-resiliency materials, such as Nyloil, an oil-impregnated cast Nylon-6, that cannot be readily molded or cast into such intricate shapes. When using such materials, conventional machining is the preferred fabrication alternative.

Figure 2:
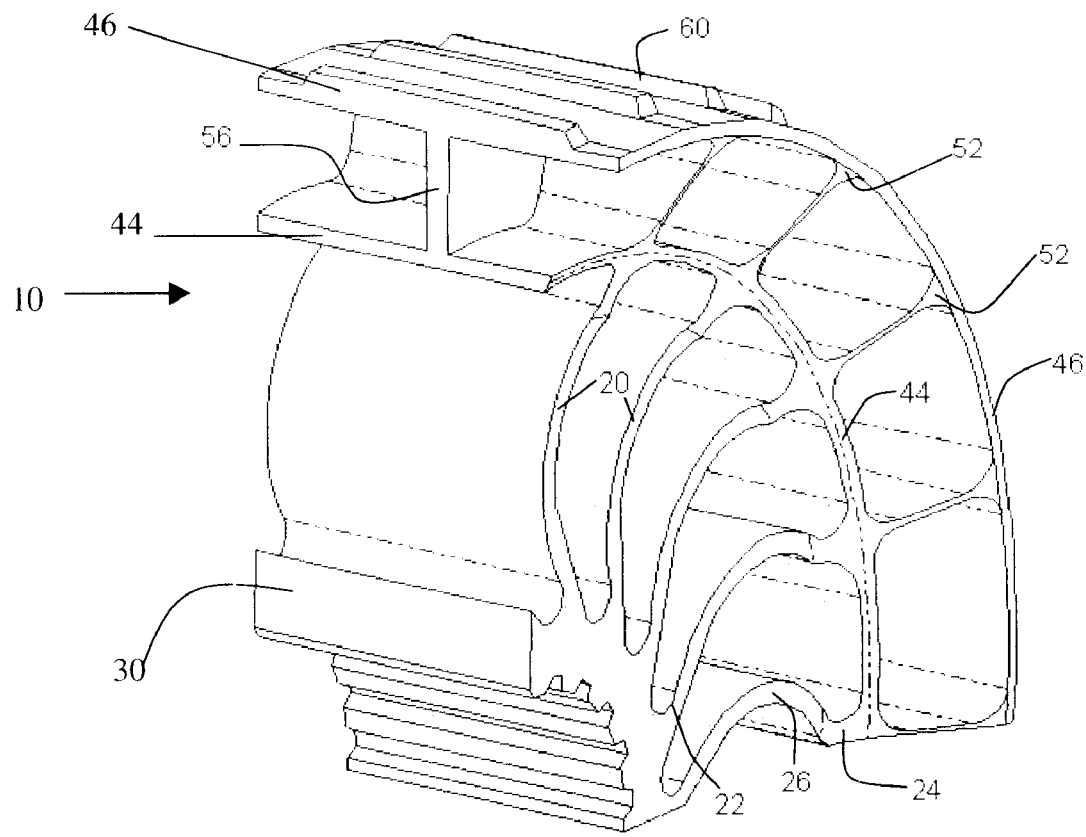
FIG. 2 shows an isometric view of a quarter section along line A—A of FIG. 1.

FIG. 2 shows an isometric cutaway view of slightly more than one-quarter of the preferred embodiment of the wheel 10 shown in FIG. 1. FIG. 2, therefore, shows the detail of the preferred embodiment of rim 40. In the preferred embodiment of the present invention, the inner rim 44 is interconnected to the outer rim 46 by a plurality of ribs 52. In the preferred embodiment, there are an equal number of ribs 52 and spokes 20, with the location of each rib 52 being co-radial with each spoke 20. In other embodiments, as few as one rib 52 or as many ribs 52, including a solid rim without ribs or approaching a solid rim, as can be accommodated may be chosen, in greater or lesser numbers than the number of spokes 20. In addition, in other embodiments, the location of the ribs 52 need not be co-radial with the location of a spoke 20.

In the preferred embodiment, the dimensions of the rim 40 were chosen based upon weight constraints, which tend to minimize the thickness of the inner rim 44 and the outer rim 46, and the limitations of certain low-cost manufacturing techniques. In the preferred embodiment, the inner rim 44 and the outer rim 46, and the ribs 52 are each approximately 1.6 mm thick. One of skill in the art will recognize that varying performance criteria and manufacturing techniques will allow for a great variance in the dimensions of the rim 40 and its constituent parts.

Using the thickness of these elements as a design constraint, an optimal distance between the inner rim.44 and the outer rim 46 can be determined based on the desired stiffness, where rim stiffness increases by the cube of the distance. In the preferred embodiment, the distance between the inner rim 44 and the outer rim 46 —which is also a dimension of the ribs 52 —is approximately 16 mm. One of skill in the art will be able to adjust these dimensions as needed to adequately distribute the loading to all of the spokes.

In the preferred embodiment, the spacing and the number of ribs 52 were chosen to match the spacing and the number of spokes 20, as the rim 40 do not provide adequate load support in other locations. Placing the ribs 52 and the spokes 20 co-radially provides the most direct load path from the surface of the wheel 10 to the spokes 20.

In order to provide an even greater measure of load distribution to the plurality to spokes 20, the preferred embodiment of the rim 40 includes a center wall 56. As shown in FIG. 2, the center wall 56 extends from the outer rim 46 to the inner rim 44, and is substantially perpendicular both to the inner rim 44 and the outer rim 46. Therefore, the center wall 56 and the inner and outer rims 44 & 46 from an annular I-beam, which is particularly well-suited to transmit load into each of the spokes 20, due to its very high area moment of inertia.

In alternative embodiments, a center wall can be used intermittently, depending on the weight and strength requirements. In yet another embodiment, multiple center walls, preferably on each surface of the wheel, can be used. In yet other embodiments, the cross-section of the rim 30 could be a box, an "X" or other sufficiently structurally sound element. One of skill in the art will recognize that the cross-section will be chosen both for its strength-weight characteristics as well as its ease of manufacturability.

In the preferred embodiment, the center wall 56 is 2.5 mm thick. In other embodiments with a center wall, the center wall 56 could be as thick as the wheel 10 itself, albeit at the sacrifice of additional weight.

Figure 3:
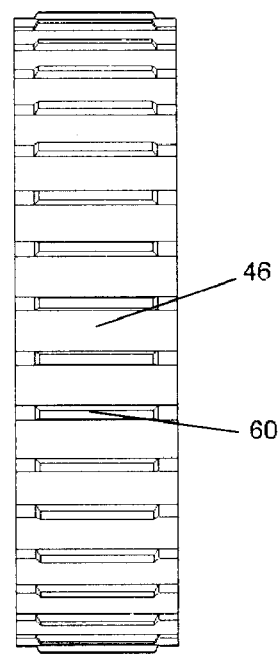
FIG. 3 shows a side view of the wheel shown in FIG. 1.

FIG. 3 shows an exterior view of the wheel 10 along a radius. In this particular embodiment, cleats 60 protrude from the outer rim 46 to engage tracks, if any. In the preferred embodiment, there are 36 cleats 60 equispaced on the outer surface of outer rim 46. The number of cleats 60 is dependent only on the track design. Other embodiments based on an identical design can support a round wheel as easily as a track; in the case of a wheel, the tire would encompass the rim.

Figure 4:
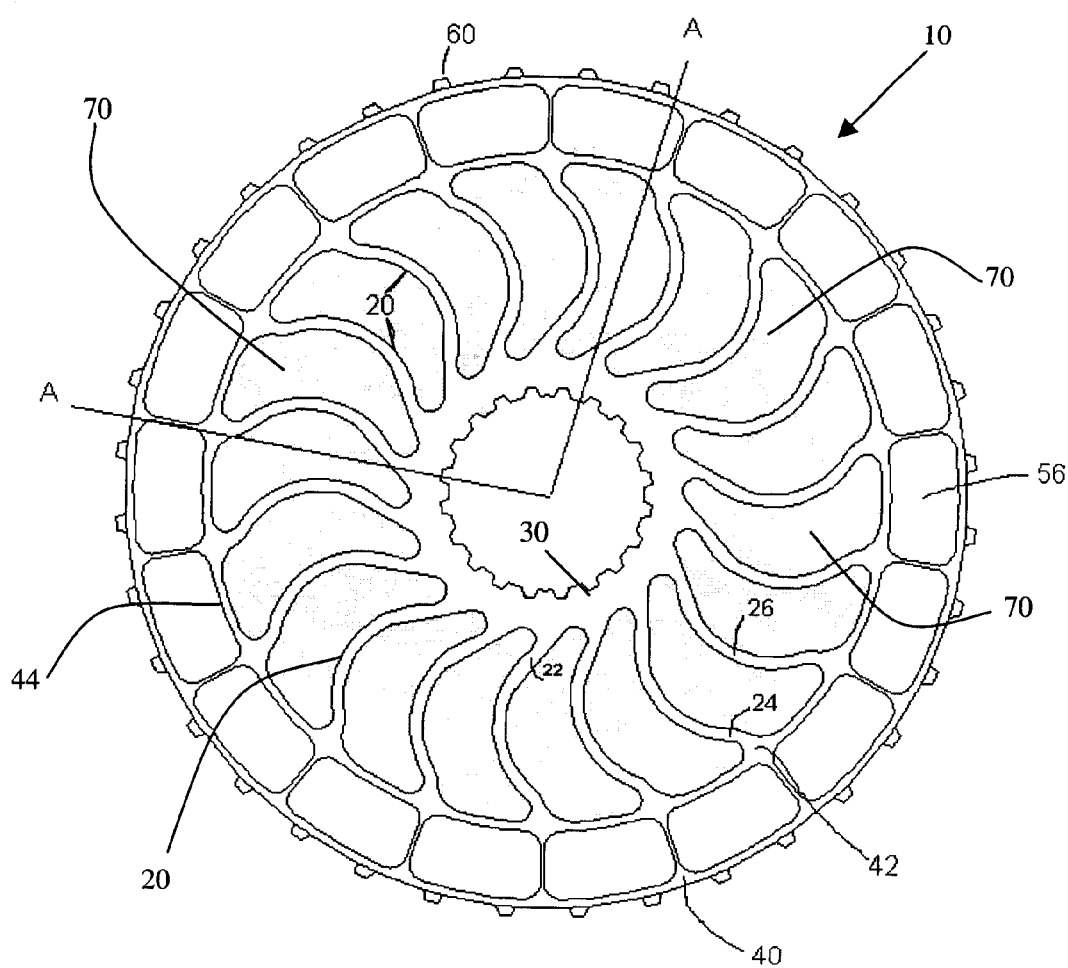
FIG. 4 an alternative embodiment of the wheel of the invention.

In an alternative embodiment shown in FIG. 4, a second material is used between the spokes 20 to provide additional support. Since the voids between the spokes 20 change volume as the wheel deforms, a lightweight energy absorbing material 70 can be used to fill these voids for higher overall energy absorption. Because materials can absorb three times as much energy in pure tension/compression as can be absorbed in bending, a filler material 70 provides additional support in certain embodiments. The filler material 70 should be a material more compliant than the spoke material, and preferably considerably more lightweight. Examples of such materials include, by way of example only, blow-molded polyurethane commonly used in athletic shoe soles. This design allows significant additional energy to be absorbed with little additional weight. In this alternative embodiment, the compliant filler material 70 should be affixed to the wheel material. Therefore, the filler material should also be amenable to bonding.

While the wheel of the present invention can be used in any number of vehicles, it is of particular utility in providing protection to a mobile robot designed to withstand significant loadings and sudden impacts. One such design is the mobile robot 80 shown in FIGS. 5A & 5B, in which the electronic components 85 are housed within the track volume. The resilient wheels 10 of the present invention then provide impact resistance that allows the robot to operate even after collisions, falls, or tumbles. Furthermore, this impact resistance allows deploying the robot in a variety of ways including tossing it from a height, such as from a window or from a helicopter.

Although the description above contain many specificities, there should not be construed as limiting the scope of the invention but as merely providing illustrations of some of the presently preferred embodiments of this invention.

Other embodiments of the invention are within the scope of the following claims.

What is claimed is:

1. A wheel structure comprising:
   a continuous, annular rim;
   a hub;
   and a plurality of spokes interconnecting said rim and said hub; each of said spokes possessing a first spoke portion integrally connected to the hub at a hub origin point, a second spoke portion integrally connected to said rim at a rim origin point, and a third spoke portion integrally connected to said first spoke portion and integrally connected to said second spoke portion; said third spoke portion extending in generally different direction than said first spoke portion; the rim further comprising an outer annular rim, an inner annular rim, rib interconnecting said outer rim to said inner rim, the inner annular rim and the outer annular rim being more rigid than at least one of the plurality spokes.

2. The wheel structure of claim 1 in which said rim further comprises a plurality of ribs interconnecting said outer rim to said inner rim.

3. The wheel structure of claim 2, wherein said plurality of ribs are substantially equispaced.

4. The wheel structure of claim 2 in which said rim further comprises a center wall connecting said outer rim to said inner rim, said center wall substantially perpendicular to said inner rim and to said outer rim, wherein said center wall is integrally connected to the plurality of ribs.

5. The wheel structure of claim 4 wherein said third spoke portion extends in a generally different direction than said second spoke portion.

6. The wheel structure of claim 5, wherein the hub origin point is co-radial with the rim origin point.

7. The wheel structure of claim 6, wherein the hub origin point is co-radial with a rib.

8. The wheel structure of claim 7 comprising an equivalent number of spokes and ribs.

9. The wheel structure of claim 8 comprising from 10 to 25 spokes.

10. The wheel structure of claim 5 wherein the plurality of spokes are spaced such that the spokes cannot come into contact with one another during compression.

11. The wheel structure of claim 7, wherein the outer rim comprises an outer surface and an inner surface, and said outer surface further comprises cleats for engaging cogs on a track.

12. The wheel structure of claim 11 wherein the wheel structure is constructed from a polymeric material.

13. The wheel structure of claim 12 wherein the wheel structure is constructed from cast polyurethane.

14. The wheel structure of claim 12 wherein the wheel structure is constructed from Nylon.

15. The wheel structure of claim 11, wherein said rim is constructed from metal and said spokes are constructed from a polymeric material.

16. The wheel structure of claim 5, further comprising a filler material positioned between any two of said spokes.

17. The wheel structure of claim 16, wherein the filler material is polyurethane.

18. The wheel structure of claim 16, wherein the hub origin point is co-radial with the rim origin point.

19. The wheel structure of claim 18, wherein the hub origin point is co-radial with a rib.

20. The wheel structure of claim 19 comprising an equivalent number of spokes and ribs.

21. The wheel structure of claim 20 comprising from 10 to 25 spokes.

22. The wheel structure of claim 21, wherein said outer rim comprises an outer surface and an inner surface, and said outer surface further comprises cleats for engaging cogs on a track.

23. The wheel structure of claim 5, wherein said third spoke portion is at least three times as long as said first spoke portion.

24. The wheel structure of claim 5, wherein said third spoke portion is at least four times as long as said second spoke portion.

25. A wheel structure for a mobile robot, comprising:

a continuous, annular rim;

a hub; and a plurality of spokes interconnecting said rim and said hub; each of said spokes possessing a first spoke portion integrally connected to the hub at a hub origin point, a second spoke portion integrally connected to said rim at a rim origin point, and a third spoke portion integrally connected to said first spoke portion and integrally connected to said second spoke portion; said third spoke portion extending in generally different direction than said first spoke portion; the rim further comprising an outer annular rim, an inner annular rim, and a rib interconnecting said outer rim to said inner rim, the inner annular rim and the outer annular rim being more rigid than at least one of the plurality spokes;

wherein said rim further comprises a plurality of ribs interconnecting said outer rim to said inner rim; wherein said wheel structure is mounted to a mobile robot.

26. A wheel structure comprising:

a hub;

a continuous, annular rim comprising an outer annular rim, an inner annular rim, and ribs interconnecting the outer annular rim to the inner annular rim; and spokes interconnecting the rim and the hub; each of the spokes comprising a first spoke portion integrally connected to the hub at a hub origin point, a second spoke portion integrally connected to the rim at a rim origin point, and a third spoke portion integrally connected to the first spoke portion and integrally connected to the second spoke portion, the third spoke portion extending in generally different direction than the first spoke portion, locations of the spokes along a circumference of the inner annular rim rim corresponding to locations of the ribs along the circumference.

27. The wheel structure of claim 26, wherein the ribs are substantially equispaced.

28. The wheel structure of claim 26, wherein the rim further comprises a center wall connecting the outer annular rim to the inner annular rim, the center wall being substantially perpendicular to the inner annular rim and to the outer annular rim, the center wall being integrally connected to the ribs.

29. The wheel structure of claim 28, wherein the third spoke portion extends in a generally different direction than the second spoke portion.

30. The wheel structure of claim 29, wherein the hub origin point is co-radial with the rim origin point.

31. The wheel structure of, claim 30, wherein the hub origin point is co-radial with a rib.

32. The wheel structure of claim 31, wherein there are an equivalent number of spokes and ribs.

33. The wheel structure of claim 32, wherein there are from 10 to 25 spokes.

34. The wheel structure of claim 27, wherein the spokes are spaced such that the spokes cannot come into contact with one another during compression.

35. The wheel structure of claim 25, wherein the outer annular rim comprises an outer surface and an inner surface, and the outer surface further comprises cleats for engaging cogs on a track.

36. The wheel structure of claim 25, wherein the wheel structure is constructed from a polymeric material.

37. The wheel structure of claim 25, wherein the wheel structure is constructed from cast polyurethane.

38. The wheel structure of claim 25, wherein the wheel structure is constructed from Nylon.

39. The wheel structure of claim 25, wherein the rim is constructed from metal and the spokes are constructed from a polymeric material.

40. The wheel structure of claim 25, further comprising a filler material positioned between any two of the spokes.

41. The wheel structure of claim 25, wherein the filler material comprises polyurethane.

42. The wheel structure of claim 25, wherein the hub origin point is co-radial with the rim origin point.

43. The wheel structure of claim 25, wherein the hub origin point is co-radial with a rib.

44. The wheel structure of claim 25, wherein there are an equivalent number of spokes and ribs.

45. The wheel structure of claim 25, wherein there area from 10 to 25 spokes.

46. The wheel structure of claim 25, wherein the outer annular rim comprises all outer surface and an inner surface, and the outer surface further comprises cleats for engaging cogs on a track.

47. The wheel structure of claim 25, wherein the third spoke portion is at least three times as long as the first spoke portion.

48. The wheel structure of claim 25, wherein the third spoke portion is at least four times as long as the second spoke portion.

* * * * *